United States Patent
Kimura (10) Patent No.: US 11,784,593 B2
(45) Date of Patent: Oct. 10, 2023

(54) POWER SUPPLY CONTROLLER

(71) Applicant: DENSO CORPORATION, Kariya (JP)

(72) Inventor: Masao Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/650,635

(22) Filed: Feb. 10, 2022

(65) Prior Publication Data
US 2022/0263440 A1 Aug. 18, 2022

(30) Foreign Application Priority Data
Feb. 12, 2021 (JP) .................... 2021-020931

(51) Int. Cl.
*H02P 7/29* (2016.01)
*H02P 7/291* (2016.01)
*H02H 7/00* (2006.01)
*F02D 11/10* (2006.01)
*F02D 9/02* (2006.01)

(52) U.S. Cl.
CPC ............... *H02P 7/291* (2016.02); *F02D 9/02* (2013.01); *F02D 11/10* (2013.01); *H02H 7/00* (2013.01)

(58) Field of Classification Search
CPC . H02P 7/291; F02D 9/02; F02D 11/10; H02H 7/00; H02J 7/0029; H02J 7/0063; H02J 7/0048
See application file for complete search history.

(56) References Cited

U.S. PATENT DOCUMENTS

| | | | |
|---|---|---|---|
| 2012/0034569 A1* | 2/2012 | Sakamoto | G01N 15/0656 431/76 |
| 2013/0278223 A1* | 10/2013 | Li | H02J 7/00041 320/136 |
| 2018/0056942 A1* | 3/2018 | Oikawa | B60S 1/586 |
| 2019/0173274 A1* | 6/2019 | Fukae | H01M 10/44 |
| 2020/0149561 A1* | 5/2020 | Hughes | F04B 23/00 |
| 2020/0159269 A1* | 5/2020 | Gao | G05F 1/67 |

(Continued)

FOREIGN PATENT DOCUMENTS

| | | | | |
|---|---|---|---|---|
| CN | 110970940 A | * | 4/2020 | ............... H02J 3/36 |
| JP | 2008-043051 A | | 2/2008 | |
| WO | WO-02073544 A1 | * | 9/2002 | ........... G07C 5/0891 |

(Continued)

*Primary Examiner* — Joseph J Dallo
(74) *Attorney, Agent, or Firm* — MASCHOFF BRENNAN (57) ABSTRACT

A power supply controller works to control electrical power supplied to a surroundings monitor including an in-vehicle camera and an image processor which monitors surroundings of a vehicle using an output from the in-vehicle camera. The power supply controller includes a voltage monitor which determines whether an operating voltage for the image processor lies in a normal voltage range and an abnormal voltage range. Until a given threshold changing condition is met after start of power supply to the surroundings monitor, the voltage monitor alters at least one of an upper limit threshold and a lower limit threshold of the normal voltage range to decrease a difference between the upper and lower limit thresholds to be lower than that after the given threshold changing condition is satisfied. This ensures the stability in supplying electrical power to the surroundings monitor without restricting an operation of the surroundings monitor more than required.

8 Claims, 8 Drawing Sheets

(56) References Cited

U.S. PATENT DOCUMENTS

2021/0316679 A1 * 10/2021 Morita .................. B60R 16/033
2021/0402939 A1 * 12/2021 Obayashi .............. H02J 7/0063

FOREIGN PATENT DOCUMENTS

| WO | WO-2015015724 A1 * | 2/2015 | ......... F02D 41/3845 |
| WO | WO-2017141716 A1 * | 8/2017 | .............. H02M 1/08 |
| WO | WO-2017208792 A1 * | 12/2017 | .......... H01M 10/425 |

* cited by examiner

POWER SUPPLY CONTROLLER

CROSS REFERENCE TO RELATED DOCUMENT

The present application claims the benefit of priority of Japanese Patent Application No. 2021-020931 filed on Feb. 12, 2021, the disclosure of which is incorporated in its entirety herein by reference.

BACKGROUND

1 Technical Field

This disclosure relates generally to a power supply controller designed to control a power supply for a surroundings monitor which works to monitor an area surrounding a vehicle.

2 Background Art

For instance, Japanese Patent First Publication No. 2008-43051 discloses an in-vehicle control system which works to detect a failure in operation of a switching device used to turn on or off a power supply line extending from a battery to a throttle motor even in the event of a variation in voltage at the battery due to, for example, aging of the battery.

Vehicles equipped with a surround view monitor to monitor surroundings thereof are usually designed to control electrical power supplied to the surround view monitor using a power supply controller. The inventor of this application has studied the use of the power supply controller in diagnosing whether an operating voltage for a monitoring functional component of the surround view monitor lies in a normal voltage range or an abnormal voltage range in order to achieve a proper operation of the monitoring functional component. The normal voltage range is preferably narrower than an operating voltage range required by the monitoring functional component for safety purposes. This, however, leads to a risk that the operation of the monitoring functional component may be undesirably restricted. This drawback has been found by the inventor of this application.

SUMMARY

It is, therefore, an object of this disclosure to provide a power supply controller which is capable of supplying electrical power to a surroundings monitoring system with a minimum restriction on operation of the surroundings monitoring system.

According to one aspect of this disclosure, there is provided a power supply controller which is configured to control electrical power supplied to a surroundings monitor. The surroundings monitor includes a sensor serving to detect conditions of surroundings of a vehicle and a monitoring device serving to monitor the surroundings of the vehicle using an output from the sensor. The power supply controller comprises: (a) a voltage detector which measures an operating voltage for the monitoring device; and (b) an abnormality determiner which determines whether the operating voltage, as measured by the voltage detector, lies in a normal voltage range or an abnormal voltage range. Until a given threshold changing condition is met after start of power supply to the surroundings monitor, the abnormality determiner alters at least one of an upper limit threshold and a lower limit threshold of the normal voltage range to decrease a difference between the upper limit threshold and the lower limit threshold to be lower than that after the given threshold changing condition is satisfied.

The inventor of this application has studied and found that the operating voltage for the monitoring device is usually subjected to a small variation until expiry of a given period of time after start of power supply to the surroundings monitor and thereafter subjected to a large variation.

In view of the above phenomenon, it is advisable that a difference between the upper limit threshold and the lower limit threshold of the normal voltage range be defined or kept to be lower than that after the threshold changing condition is met for a period of time between start of supply of electrical power to the surroundings monitor and satisfaction of the threshold changing condition.

The above altering of the difference between the upper limit threshold and the lower limit threshold of the normal voltage range will result in narrowing of the normal voltage range in a period of time when the variation in operating voltage for the monitoring device is expected to become low. This achieves proper monitoring of the operating voltage for the monitoring device without sacrificing safety. Conversely, the normal voltage range is changed to be widened in a period of time where the variation in operating voltage for the monitoring device is expected to be high. This eliminates a risk that the monitoring device may be restricted in operation more than required. The power supply controller in this disclosure is, therefore, capable of achieving a proper supply of electrical power to the surroundings monitor while minimizing the degree of restriction in operation of the surroundings monitor.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below with reference to the drawings. Throughout the embodiments, the same reference numbers will refer to the same parts, and explanation thereof in detail will be omitted here. When only parts of components in one of the embodiments are referred to, the explanation of the other parts in the other embodiments is applied. Each of the embodiments may be designed to include all possible combinations or modifications of the components in the other embodiments unless otherwise specified.

First Embodiment

The first embodiment will be described below with reference to FIGS. 1 to 8. This first embodiment will refer to an example where the power supply controller 50 is used with the surroundings monitoring system 10 for vehicles.

Figure 1:
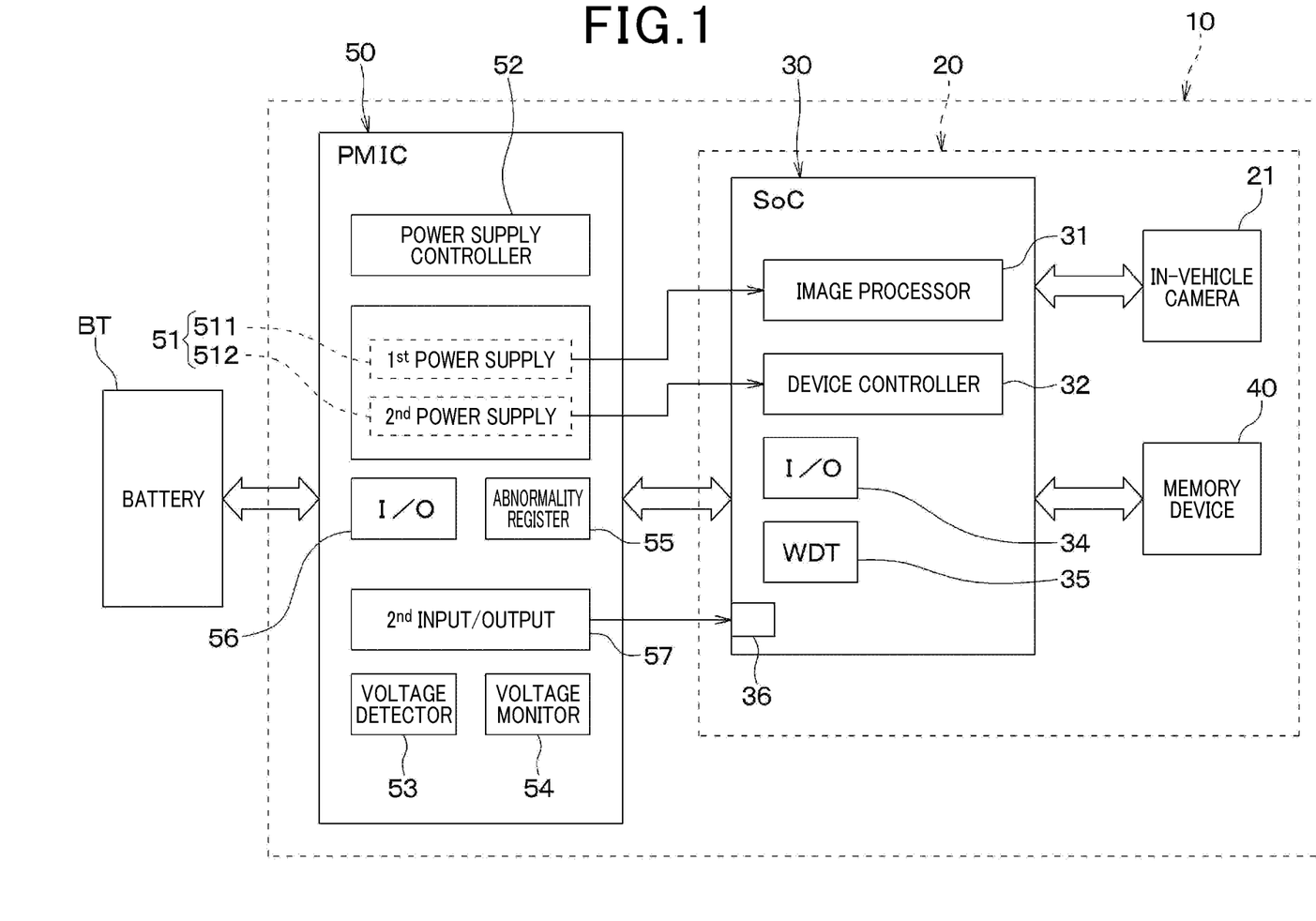
FIG. 1 is a block diagram which illustrates a surroundings monitoring system with which a power supply controller according to the first embodiment is used.

The surroundings monitoring system 10 is an in-vehicle system, such as a driver-assistance system or a self-driving system for vehicles. The surroundings monitoring system 10, as illustrated in FIG. 1, includes the surroundings monitor 20 and the power supply controller 50. The term "surroundings monitoring", as referred to herein, represents monitoring of an area surrounding the vehicle in at least one of directions: forward, forward oblique, lateral, lateral oblique, and backward direction of the vehicle.

The surroundings monitor 20 is made in the form of a camera module including the in-vehicle camera 21 which captures an image of surroundings of the vehicle. The in-vehicle camera 21 serves as a sensor to monitor conditions of surroundings of the vehicle. Specifically, the in-vehicle camera 21 is installed inside a passenger compartment of the vehicle and oriented to face a windshield of the vehicle.

The surroundings monitor 20 also includes the SoC (System on a Chip) 30 serving as an image processor and the memory device 40. In this embodiment, the SoC 30 is designed as a controller for the surroundings monitor 20.

The SoC 30 is made of an integrated circuit that is a single semiconductor chip including a set of electronic circuits such as a processor, a controller, a memory, etc. Specifically, the SoC 30 includes functional circuits: the image processor 31, the device controller 32, the first input/output device 34, the watch dog timer 35, and the reset terminal 36 which are integrated into a single semiconductor chip. The SoC 30 also includes a memory designed as a non-transitory computer-readable medium (i.e., a tangible storage medium).

The image processor 31 serves as a monitoring device which monitors surroundings of the vehicle using an output from the in-vehicle camera 21. Specifically, the image processor 31 processes an image captured by the in-vehicle camera 21 to monitor surroundings of the vehicle. The image processor 31 operates on electrical power supplied from the power supply controller 50.

The device controller 32 constitutes a portion of the SoC 30 working as an image processor. The device controller 32 works to control operations of the in-vehicle camera 21 serving as a sensor and the image processor 31 serving as a monitoring device. The device controller 32 operates on electrical power supplied from the power supply controller 50.

The first input/output device 34 is designed as a communication interface for achieving communication with other devices, such as the memory device 40 and the power supply controller 50. For instance, data on an image taken by the in-vehicle camera 21 is inputted into the SoC 30 through the first input/output device 34. Additionally, data on any malfunction of the SoC 30 is also outputted to the memory device 40 through the input/output device 34.

The watch dog timer 35 is a diagnosing circuit which analyzes outputs from the image processor 31 and the device controller 32 to determine whether the SoC 30 is properly operating. When detecting a fault in operation of the SoC 30, the watch dog timer 35 stops outputting a proper operation indicative signal to the power supply controller 50. The proper operation indicative signal is a signal indicating the fact that the SoC 30 is properly operating.

The reset terminal 36 is a terminal into which a reset request signal or a standby cancellation signal (will also be referred to as a reset state cancellation signal) from the power supply controller 50. The reset terminal 36 is connected to the reset controller 57 of the power supply controller 50 through a signal line. When receiving the reset request signal from the power supply controller 50, the SoC 30 resets the operations of the image processor 31 and the device controller 32 and suspends them, in other words, places the image processor 31 and the device controller 32 in a standby state. Alternatively, when receiving the standby cancellation signal from the power supply controller 50, the SoC 30 activates or restarts the image processor 31 and the device controller 32.

The reset terminal 36 in this embodiment is engineered to discretely perform the resetting operation or the standby state cancellation operation for the image processor 31 and the device controller 32. Specifically, when receiving the reset request signal for the image processor 31 which is outputted by the power supply controller 50, the SoC 30 resets the operation of the image processor 31. When receiving the reset request signal for the device controller 32 which is outputted from the power supply controller 50, the SoC 30 resets the operation of the device controller 32. Alternatively, when receiving the standby cancellation signal for the image processor 31 which is outputted from the power supply controller 50, the SoC 30 restarts the operation of the image processor 31. When receiving the standby cancellation signal for the device controller 32 which is outputted from the power supply controller 50, the SoC 30 starts the operation of the device controller 32.

The memory device 40 is a storage medium arranged outside the SoC 30. The memory device 40 includes a non-volatile memory. The memory device 40 is supplied with electrical power from the power supply controller 50. The supply of electrical power to the memory device 40 is achieved separately from that to the SoC 30.

The power supply controller 50 serves as a power supply which delivers electrical power to the image processor 31 and the device controller 32 of the SoC 30 using a battery BT mounted in the vehicle. The power supply controller 50 is made of a PMIC (Power Management IC). The power supply controller 50 includes a memory made of a non-transitory computer-readable medium.

Specifically, the power supply controller 50 includes the power supply 51, the power supply controller 52, the voltage detector 53, the voltage monitor 54, the abnormality register 55, the second input/output device 56, and the reset controller 57. The power supply 51 generates a level of voltage suitable for the operation of each of the image processor 31 and the device controller 32 and delivers it to a corresponding one of the image processor 31 and the device controller 32. The levels of voltage outputted from the power supply 51 to the image processor 31 and the device controller 32 are suitable for the image processor 31 and the device controller 32. Specifically, the power supply 51 includes the first power supply 511 and the second power supply 512. The first power supply 511 is used to deliver electrical power to the image processor 31. The second power supply 512 is used to deliver electrical power to the device controller 32.

The power supply controller 52 works to control the operation of the power supply 51. Specifically, the power supply controller 52 controls the operation of the power supply 51 to deliver electrical power to the image processor 31 and the device controller 32 at times required by the image processor 31 and the device controller 32.

The voltage detector 53 works to detect levels of voltage developed at a terminal of the battery BT and levels of operating voltage for the image processor 31 and the device controller 32 of the SoC 30. The voltages detected by the voltage detector 53 are outputted to the voltage monitor 54.

The voltage monitor 54 works to monitor the operating voltage for the image processor 31 and the device controller 32. Specifically, the voltage monitor 54 serves as an abnormality determiner which analyzes the voltages measured by the voltage detector 53 to determine whether the operating voltage for each of the image processor 31 and the device controller 32 lies in a normal voltage range NV or an abnormal voltage range.

The normal voltage range NV, as referred to herein, is selected to be in a range of voltage recommended as an operating voltage for the SoC 30. The abnormal voltage range is selected to be in a range excluding the normal voltage range NV. Specifically, the abnormal voltage range includes an overvoltage range OV of an upper limit threshold Vu of the normal voltage range NV to a rated voltage for the image processor 31 and the device controller 32 and a undervoltage range UV of a lower limit threshold Vd of the normal voltage range NV to a minimum operating voltage for the image processor 31 and the device controller 32.

The abnormality register 55 is a register which stores therein abnormality indicating data which indicates any abnormality in the condition (e.g., malfunction) of the power supply controller 50. The abnormality in condition of the power supply controller 50 includes, for example, an unusual operating voltage for the power supply controller 50 or an unusual temperature of the power supply controller 50. The abnormality indicating data is expressed by, for example, one of bit flags. When an abnormality occurs in the power supply controller 50, one of the bits which corresponds to the type of the abnormality is set to one. The abnormality register 55 is made of a volatile memory. The abnormality register 55 may be made a general purpose register or a reserved register.

The second input/output device 56 is designed as a communication interface for achieving communication with other devices, such as SoC 30, etc. For instance, an output signal from the watch dog timer 35 of the SoC 30 is inputted to the second input/output device 56. Additionally, the abnormality indicating signal stored in the abnormality register 55 is inputted to the memory device 40 through the second input/output device 56.

The reset controller 57 outputs the reset request signal to the SoC 30 in response to occurrence of abnormality in condition of the surroundings monitoring system 10 and alternatively outputs the standby cancellation signal to the SoC 30 upon start of the surroundings monitoring system 10. The reset controller 57 in this embodiment is engineered to discretely perform the resetting operation or the standby state cancellation operation for the image processor 31 and the device controller 32. Specifically, when it is required to reset the image processor 31, the reset controller 57 outputs the reset request signal to the SoC 30 to reset the image processor 31. When it is also required to reset the device controller 32, the reset controller 57 outputs the reset request signal to the SoC 30 to reset the device controller 32. Alternatively, when it is required to cancel the standby state of the image processor 31, the reset controller 57 outputs the standby cancellation signal to the SoC 30 to cancel the standby state of the image processor 31. When it is also required to cancel the standby state of the device controller 32, the reset controller 57 outputs the standby cancellation signal to the SoC 30 to cancel the standby state of the device controller 32.

Figure 2:
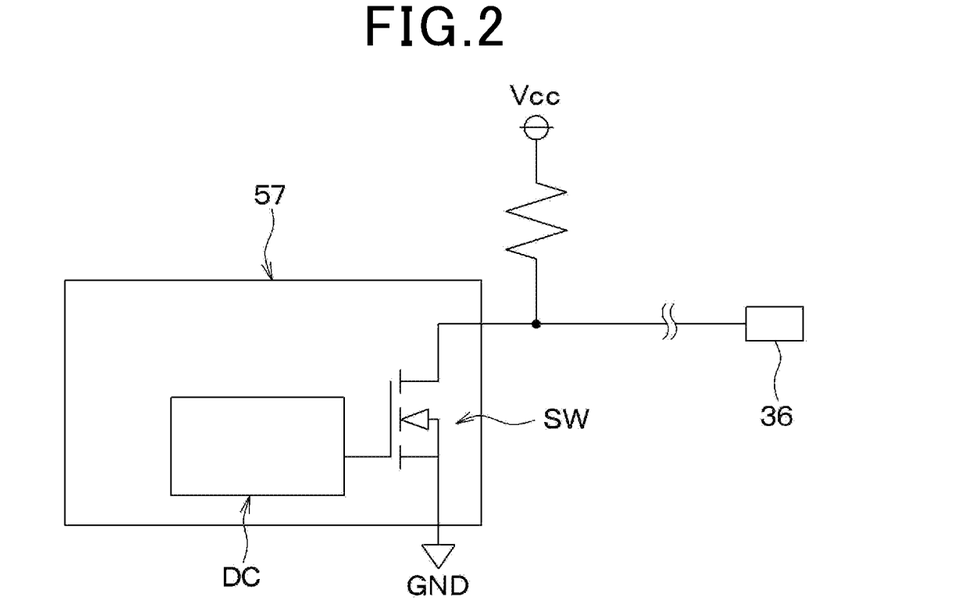
FIG. 2 is a schematic view which illustrates a circuit structure of a reset controller installed in the power supply controller shown in FIG. 1.
Figure 3:
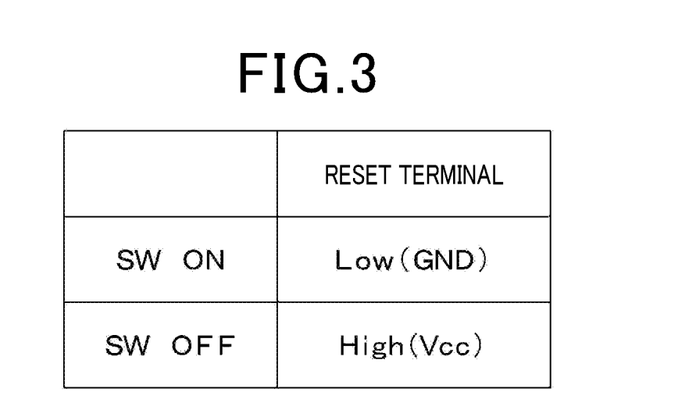
FIG. 3 is a view which illustrates a table demonstrating an operation of the reset controller in FIG. 2.

The reset controller 57, as can be seen in FIG. 2, includes an open drain switch SW and a driver circuit DC for the open drain switch SW. The reset controller 57 may alternatively or additionally be designed to have a semiconductor switch other than the open drain switch SW.

When the open drain switch SW is in an on-state (i.e., a closed state), the reset controller 57 outputs a signal Low which is at the same potential as ground to the reset terminal 36 of the SoC 30. The signal Low is a signal requesting the SoC 30 to perform the resetting operation. Upon input of the signal Low to the reset terminal 36, the SoC 30 resets at least one of the image processor 31 and the device controller 32.

Alternatively, when the open drain switch SW is in an off-state (i.e., an open state), the reset controller 57 outputs a signal High which is at the same potential as Vcc (i.e., power supply potential) to the reset terminal 36 of the SoC 30. The signal High is a signal requesting the SoC 30 to perform the standby state cancellation operation. Upon input of the signal High to the reset terminal 36, the SoC 30 cancels the standby states of the image processor 31 and the device controller 32 to actuate or start it.

In operation, the surroundings monitoring system 10 operates the power supply controller 50 to determine whether the operating voltage for the image processor 31 lies in the normal voltage range NV or the abnormal voltage range. It is advisable that the normal voltage range NV be selected to be narrower than that recommended for safety purposes. Too narrow a normal voltage range NV will cause the operation of the image processor 31 to be undesirably restricted. A study made by the inventor of this application shows that the operating voltage for the image processor 31 is usually subjected to a small variation until the expiry of a given period of time after start of power supply to the surroundings monitor 20 and thereafter subjected to a large variation.

In view of the above phenomenon, the power supply controller 50 performs a control operation to change and maintain the normal voltage range NV in a period of time after start of power supply to the surroundings monitor 20 until completion of start of the surroundings monitor 20. The control operation is executed by the voltage monitor 54 of the power supply controller 50. A control task executed by the power supply controller 50 will be described below with reference to FIG. 4.

Figure 4:
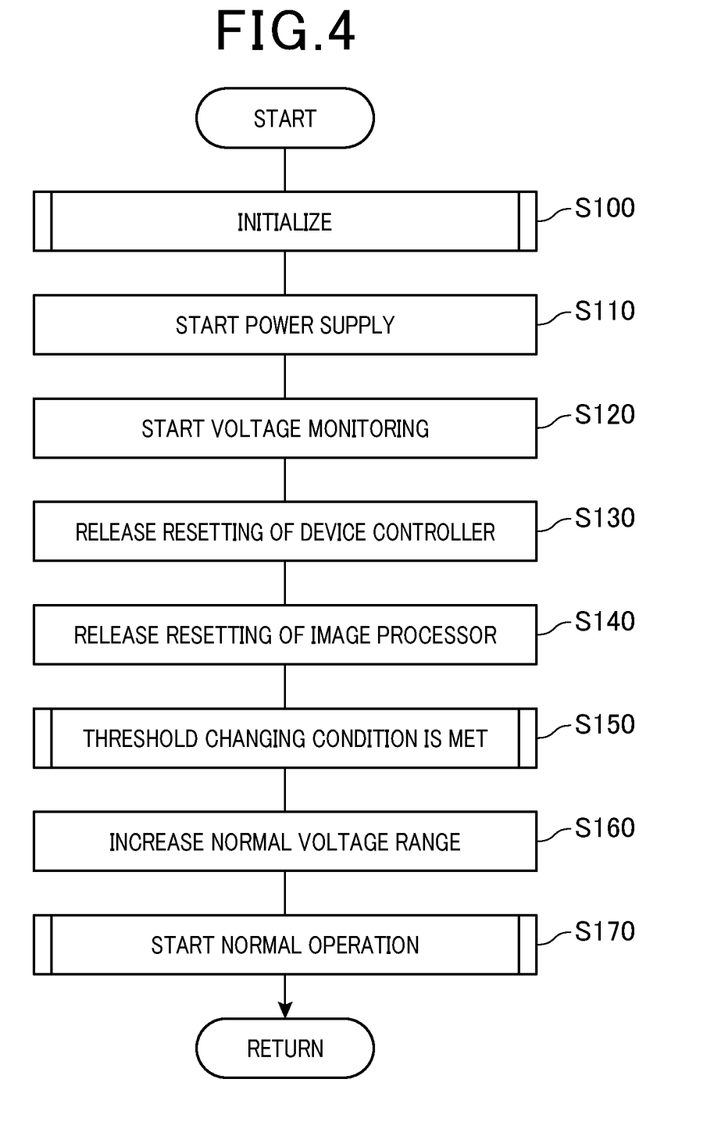
FIG. 4 is a flowchart of a control task executed by a power supply controller in the first embodiment.

FIG. 4 is a flowchart of a sequence of logical steps or program executed by the power supply controller 50. In response to turning on of an ignition switch of the vehicle to actuate various devices in the vehicle, the power supply controller 50 initiates the control task demonstrated in FIG. 4.

After entering the program in FIG. 4, the routine proceeds to step S100 wherein the power supply controller 50 performs an initializing operation to assign initial values to the memory and the flag in the SoC 30. Specifically, in the initializing operation, initial values are assigned to the normal voltage range NV and the abnormal voltage range.

The variation in operating voltage for the image processor 31 is, as described above, high until the expiry of a given period of time after start of power supply to the surroundings monitor 20 and thereafter becomes low.

In view of the above variation in operating voltage, until a given threshold changing condition is satisfied after start of power supply to the surroundings monitor 20, a difference between the upper limit threshold Vu and the lower limit threshold Vd of the normal voltage range NV is kept lower than that after the given threshold changing condition is met.

Figure 5:
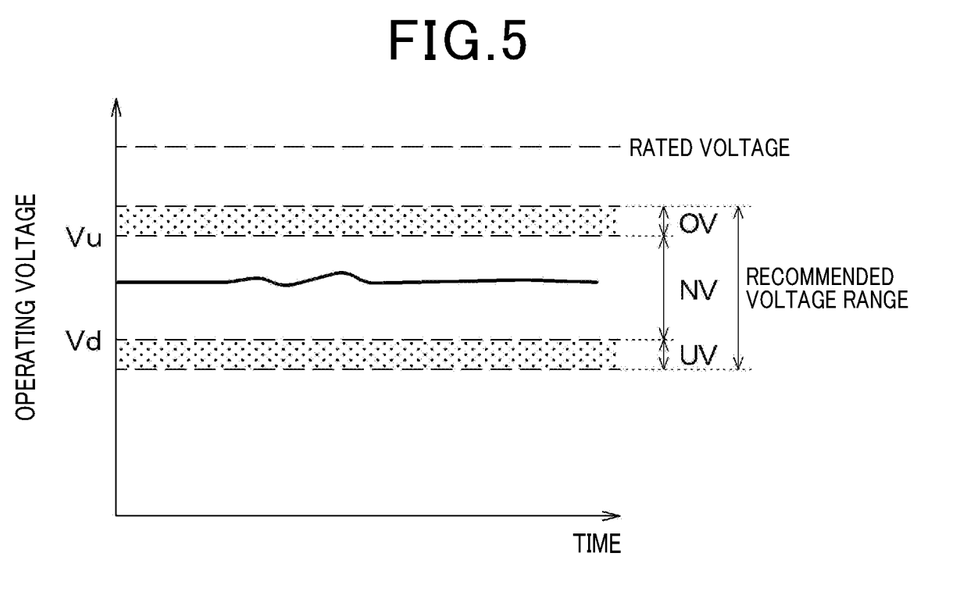
FIG. 5 is a view which illustrates how to define a normal voltage range and an abnormal voltage range in an initializing operation of a power supply controller in the first embodiment.

Specifically, in the initializing operation, the upper limit threshold Vu and the lower limit threshold Vd are, as demonstrated in FIG. 5, selected to have all the normal voltage range NV, the overvoltage range OV, and the undervoltage range UV lie in the recommended voltage range. In the example illustrated in FIG. 5, the overvoltage range OV and the undervoltage range UV are determined so that an upper limit of the overvoltage range OV is identical with that of the recommended voltage range, and a lower limit of the undervoltage range UV is identical with that of the recommended voltage range.

Afterwards, the routine proceeds to step S110 wherein the power supply controller 50 starts delivering electrical power to the surroundings monitor 20. This causes the power supply 51 of the power supply controller 50 to supply suitable operating voltages to the devices installed in the surroundings monitor 20, respectively.

The routine proceeds to step S120 wherein the power supply controller 50 starts a voltage monitoring operation to monitor the operating voltage of each of the devices installed in the surroundings monitor 20. An example of the voltage monitoring operation will be discussed below with reference to FIG. 6. The voltage monitoring operation is executed by the voltage monitor 54 of the power supply controller 50.

Figure 6:
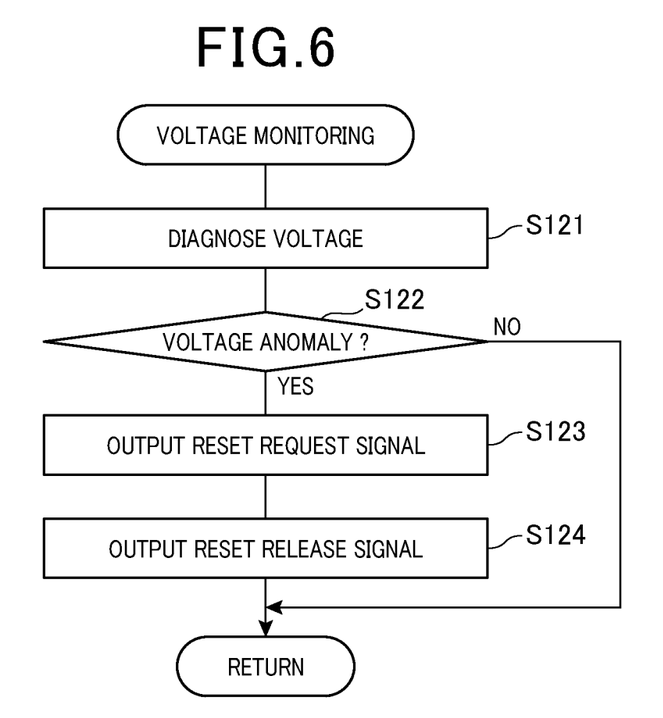
FIG. 6 is a flowchart of a voltage monitoring task executed by a power supply controller in the first embodiment.

First, in step S121 in FIG. 6, the power supply controller 50 carries out a voltage diagnosis. Specifically, in the voltage diagnosis, the voltage detector 53 measures the operating voltages of the devices in the surroundings monitor 20. The routine then proceeds to step S122 wherein the power supply controller 50 analyzes each of the operating voltages, as measured by the voltage detector 53, to determine whether it lies in the normal voltage range NV or the abnormal voltage range. If a NO answer is obtained meaning that no voltage anomaly is occurring, then the routine terminates the voltage diagnosis. Alternatively, if a YES answer is obtained in step S122, then the routine proceeds to step S123 wherein the power supply controller 50 outputs the reset request signal to the SoC 30. Specifically, the power supply controller 50 turns on the open drain switch SW of the reset controller 57 to output the signal Low that is at the same potential as ground to the reset terminal 36 of the SoC 30. This causes the SoC 30 to reset the image processor 31 and the device controller 32.

The routine proceeds to step S124 wherein the power supply controller 50 outputs the standby cancellation signal to the SoC 30. Specifically, the power supply controller 50 turns off the open drain switch SW of the reset controller 57 to output the signal High that is at the same potential as Vcc to the reset terminal 36 of the SoC 30. This starts the image processor 31 and the device controller 32. These operations described thus far correspond to the voltage monitoring task.

Referring back to FIG. 4, after the voltage monitoring task is initiated, the routine proceeds to step S130 wherein the power supply controller 50 outputs the standby cancellation request signal to the SoC 30 to cancel the standby state of the device controller 32. This actuates the device controller 32.

The routine then proceeds to step S140 wherein the power supply controller 50 outputs the standby cancellation request signal to the SoC 30 to cancel the reset state, i.e., the standby state of the image processor 31, thereby actuating the image processor 31.

The routine proceeds to step S150 wherein the power supply controller 50 makes a determination of whether a threshold changing condition is satisfied. Specifically, the power supply controller 50 determines whether the threshold changing condition is met after start of power supply to the surroundings monitor 20. Such a determination will be described in detail with reference to FIG. 7.

Figure 7:
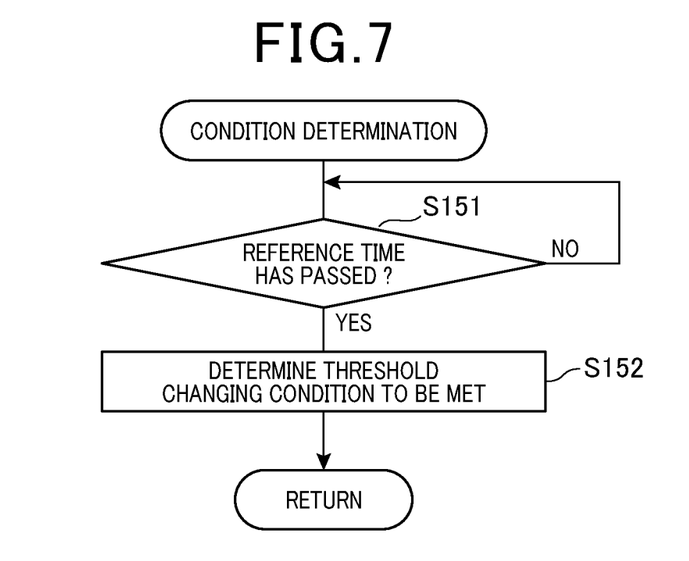
FIG. 7 is a flowchart of a condition determining task executed by a power supply controller in the first embodiment.

The power supply controller 50, as can be seen in FIG. 7, determines in step S151 whether a reference time has passed. The reference time is selected to be shorter than or equal to a required start time that is a period of time required to complete start of the image processor 31 after start of power supply to the surroundings monitor 20. The reference time in this embodiment is set to be equal to the required start time. For instance, the required start time is the sum of a period of time elapsed until the standby cancellation signal for the image processor 31 is outputted after start of power supply to the surroundings monitor 20 and a period of time required to start up the image processor 31.

If a NO answer is obtained meaning that the reference time has not yet passed after start of power supply to the surroundings monitor 20, the power supply controller 50 repeats the operation in step S151. Alternatively, if a YES answer is obtained, then the routine proceeds to step S152 wherein the power supply controller 50 turns on a condition determination flag which represents the fact that the threshold changing condition is met. The routine then terminates.

Referring back to FIG. 4, when the condition determination flag is turned on in the above condition determination, the routine proceeds to step S160 wherein the power supply controller 50 increases or widen the normal voltage range NV, as having been defined to be narrower than the recommended voltage range in the initializing operation, to be identical with the recommended voltage range.

Figure 8:
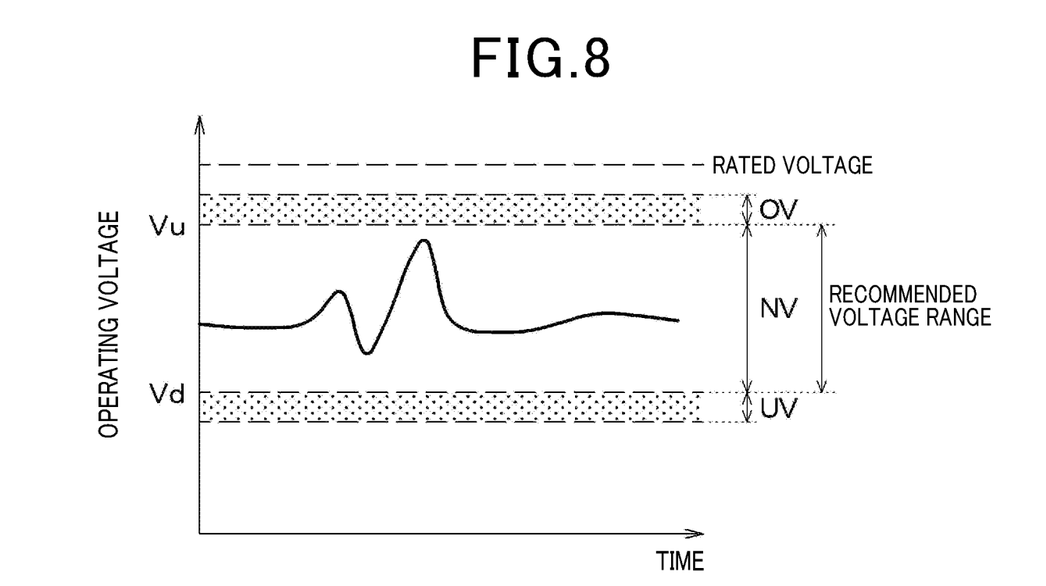
FIG. 8 is a view which demonstrates how to define a normal voltage range and an abnormal voltage range after a threshold changing condition is met.

Specifically, the power supply controller 50, as demonstrated in FIG. 8, determines the upper limit threshold Vu and the lower limit threshold Vd to bring the normal voltage range NV into agreement with the recommended voltage range. In the example illustrated in FIG. 8, the overvoltage range OV and the undervoltage range UV are selected to lie outside the recommended voltage range. In other words, the overvoltage range OV is defined to have the lower limit higher than the upper limit of the recommended voltage range. The undervoltage range UV is also defined to have the upper limit lower than the lower limit of the recommended voltage range. After the normal voltage range NV is increased in the above manner, the routine proceeds to step S170 wherein the power supply controller 50 starts the normal operation.

As apparent from the above discussion, the power supply controller 50 determines a difference between the upper limit threshold Vu and the lower limit threshold Vd of the normal voltage range NV to be kept lower than that set after the given threshold changing condition is met until after the given threshold changing operation is satisfied following start of electrical power to the surroundings monitor 20.

The changing of the normal voltage range NV in the above manner results in a decrease in the normal voltage range NV in a period of time where the image processor 31 is expected to undergo a small variation in operating voltage, thereby achieving proper monitoring of the operating voltage for the image processor 31 without sacrificing safety. Conversely, the normal voltage range NV is changed to be widened in a period of time where the image processor 31 is expected to be subjected to a large variation in operating voltage, thereby minimizing a risk that the operation of the image processor 31 may be undesirably restricted. The power supply controller 50 is, therefore, capable of ensuring the stability in supplying electrical power to the surroundings monitor 20 without restricting the operation of the surroundings monitor 20.

This embodiment offers the following beneficial advantages.

1) The above-described threshold changing condition is a condition which is satisfied between start of supply of electrical power to the surroundings monitor 20 and completion of start-up of the surroundings monitor 20. After the completion of start-up of the surroundings monitor 20, the image processor 31 starts monitoring surroundings of the vehicle, thereby resulting in an increased variation in operating voltage for the image processor 31. For such reasons, it is advisable that the threshold changing condition be selected to be met in a period of time until the completion of start-up of the surroundings monitor 20 after start of supply of electrical power to the surroundings monitor 20.

2) The threshold changing condition is a condition which is satisfied upon expiry of the reference time after start of supply of electrical power to the surroundings monitor 20. The reference time is selected to be shorter than or equal to the required start time that is a period of time required to complete start of the image processor 31 after start of power supply to the surroundings monitor 20. This causes the normal voltage range NV to be increased before a variation in operating voltage for the image processor 31 is expected to become high, thereby eliminating a risk that the operation of the image processor 31 may be restricted more than required.

3) The image processor 31 and the device controller 32 are made by an integrated circuit fabricated on a single semiconductor chip. This enables the surroundings monitor 20 to be reduced in size or weight and results in an increase in operation speed thereof.

4) The surroundings monitor 20 is equipped with the in-vehicle camera 21 serving as a sensor and the image processor 31 serving as a monitoring device. The image processor 31 which is configured to process an image captured by the in-vehicle camera 21 is used to derive various types of information about surroundings of the vehicle and a device essential for achieving driver assistance in the vehicle or an automatic operation of the vehicle. The reduction in restriction on the operations of the above devices or stability in supplying electrical power thereto, therefore, contributes improvement on reliability of the driver assistance in the vehicle or the automatic operation of the vehicle.

Modifications of First Embodiment

The first embodiment has specified, as an example, values of the upper limit threshold Vu and the lower limit threshold Vd of the normal voltage range NV after the threshold changing condition is met, but however, the upper limit threshold Vu and the lower limit threshold Vd may alternatively be set to other values. The first embodiment is designed to change the values of the upper limit threshold Vu and the lower limit threshold Vd of the normal voltage range NV between before and after the threshold changing condition is met, but however, only either of the values of the upper limit threshold Vu and the lower limit threshold Vd nay alternatively be altered. This is true for the following embodiments.

The first embodiment has referred to the example wherein the reset state of the image processor 31 is cancelled, in other words, the image processor 31 is restarted following cancellation of the standby state (i.e., restarting) of the device controller 32, but however, these restarting times may be altered. For instance, the power supply controller 50 may be designed to simultaneously cancel the standby states of the device controller 32 and the image processor 31. The power supply controller 50 may alternatively perform the condition determination in FIG. 7 before canceling the standby state of the image processor 31.

Second Embodiment

Figure 9:
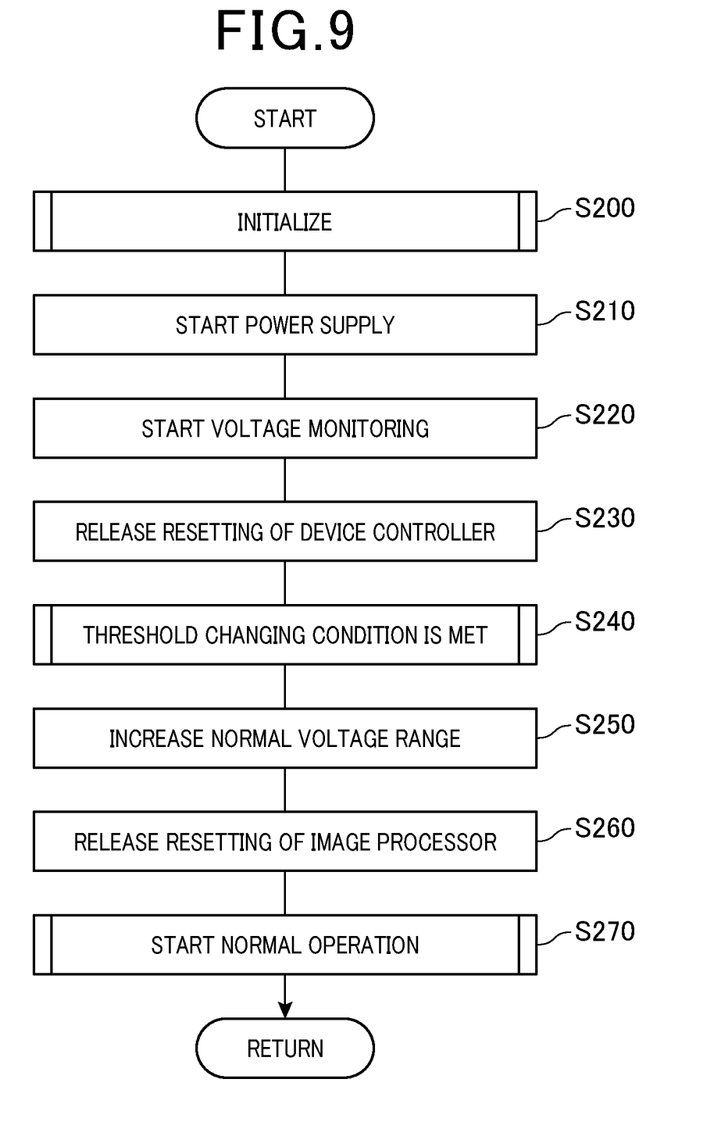
FIG. 9 is a flowchart of a voltage monitoring task executed by a power supply controller in the second embodiment.

The second embodiment will be described below with reference to FIGS. 9 to 11. The following discussion will refer only differences in the second embodiment from those in the first embodiment. FIG. 9 is a flowchart of a program executed by the power supply controller 50 instead of that illustrated in FIG. 4 in the first embodiment. steps S200, S210, and S220 are identical in operation with steps S100, S110, and S120 in FIG. 4, and explanation thereof in detail will be omitted here.

After completion of the voltage monitoring operation in step S220, the routine proceeds to step S230 wherein the power supply controller 50 outputs the standby cancellation request signal to the SoC 30 to cancel the standby state of the device controller 32.

Figure 10:
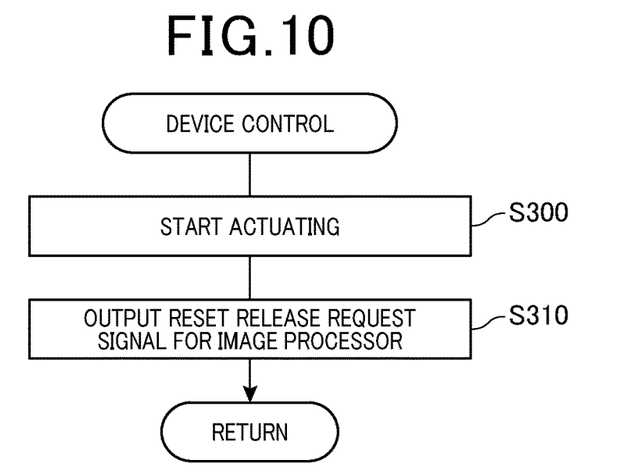
FIG. 10 is a flowchart of a condition determining task executed by a power supply controller in the second embodiment.

We receiving the standby cancellation signal from the power supply controller 50, the device controller 32 starts to be actuated in step S300 illustrated in FIG. 10. The device controller 32 then outputs a request signal to the power supply controller 50 in step S310 for requesting the cancellation of the standby state of the image processor 31.

After outputting the standby cancellation signal to the device controller 32 in step S230, the routine proceeds to step S240 wherein the power supply controller 50 executes the condition determination operation to determine whether the threshold changing condition is met. Such a determination will be described below in detail with reference to FIG. 11.

Figure 11:
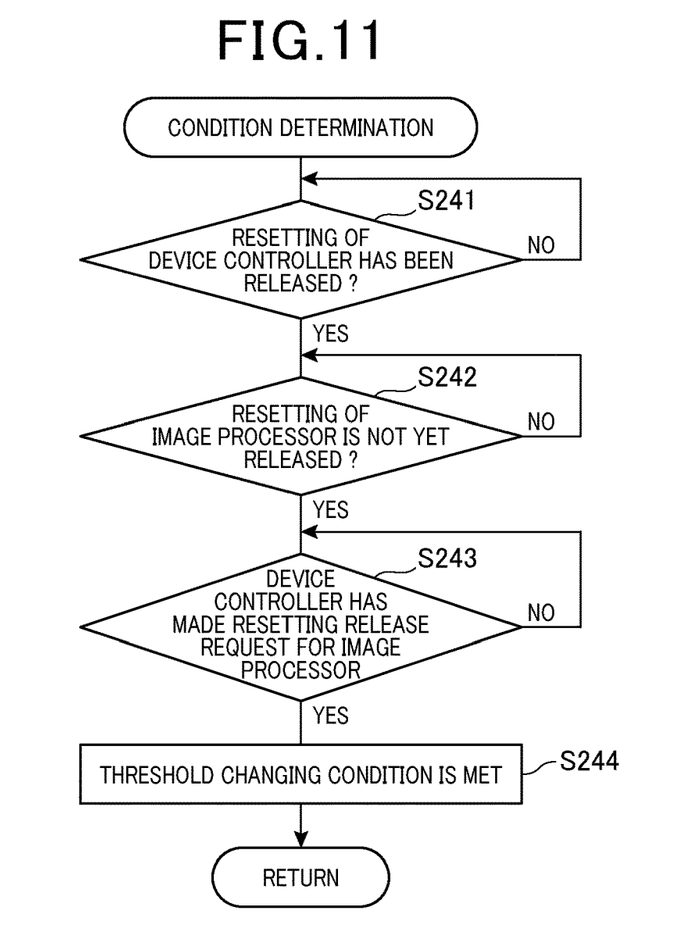
FIG. 11 is a view which demonstrates an operation of a power supply controller executed when a device controller receives a standby cancellation signal in the second embodiment.

After entering step S240 in FIG. 9, the routine proceeds to step S241 in FIG. 11 wherein the power supply controller 50 determines whether the reset state, in other words, the standby state of the device controller 32 has been cancelled. If a YES answer is obtained meaning that the device controller 32 has been restarted, then the routine proceeds to step S242.

In step S242, the power supply controller 50 determines whether the standby state of the image processor 31 is not yet cancelled. If a YES answer is obtained meaning that the standby state of the image processor 31 is not yet cancelled, then the routine proceeds to step S243 wherein the power supply controller 50 determines whether the standby cancellation request signal has received from the device controller 32 for cancelling the standby state of the image processor 31.

If a YES answer is obtained in step S243 meaning that the standby cancellation request signal has been received from the device controller 32, then the routine proceeds to step S244 wherein the power supply controller 50 turns on the condition determination flag which represents the fact that the threshold changing condition is met. The routine then terminates.

After turning on the threshold changing flag, the routine proceeds to step S250 in FIG. 9 wherein the power supply controller 50 increases or widen the normal voltage range NV, as having been defined to be narrower than the recommended voltage range in the initializing operation, to be identical with the recommended voltage range. This operation is identical with that in step S160 in the first embodiment, and explanation thereof in detail will be omitted here.

Subsequently, the routine proceeds to step S260 wherein the power supply controller 50 outputs the standby cancellation request signal to the SoC 30 to request the cancellation of the standby state of the image processor 31. This starts actuating the image processor 31. After increasing the normal voltage range NV in the above way, the power supply controller 50 starts executing the normal operation in step S270.

Other arrangements are identical with those in the first embodiment, and explanation thereof in detail will be omitted here. The power supply controller 50 in this embodiment offers substantially the same beneficial advantages as those in the first embodiment.

1) The image processor 31 is designed to be actuated upon or after reception of the standby cancellation signal following the start of supply of electrical power to the surroundings monitor 20. The threshold changing condition is a condition which is met between the start of supply of electrical power to the surroundings monitor 20 and the cancellation of the standby state of the image processor 31. This causes the normal voltage range NV to be widened before a variation in operating voltage for the image processor 31 is expected to have been high, thereby minimizing a risk that the operation of the image processor 31 may be restricted more than required.

2) Specifically, the threshold changing condition is selected to be satisfied at a time when the voltage monitor 54 of the power supply controller 50 receives a given signal produced by the device controller 32 in a period of time between the start of the device controller 32 and the cancellation of standby state of the image processor 31. As long as the threshold changing condition is, as described above, defined as a condition which is met in response to a signal outputted from the device controller 32 actuated before actuation of the image processor 31, it is possible to widen the normal voltage range NV before completion of actuation of the image processor 31, thereby eliminating the unwanted restriction of operation of the image processor 31.

Modification of Second Embodiment

The threshold changing condition in the second embodiment is, as described above, defined to be satisfied upon reception of the given signal in the voltage monitor 54 of the power supply controller 50 which is outputted from the device controller 32 before the standby state of the image processor 31 is cancelled, but however, may be modified as a condition which is met upon output of the standby cancellation signal to cancel the standby state of the image processor 31.

Third Embodiment

The third embodiment will be described below with reference to FIG. 12. The following discussion will refer only differences in the third embodiment from those in the first embodiment.

Figure 12:
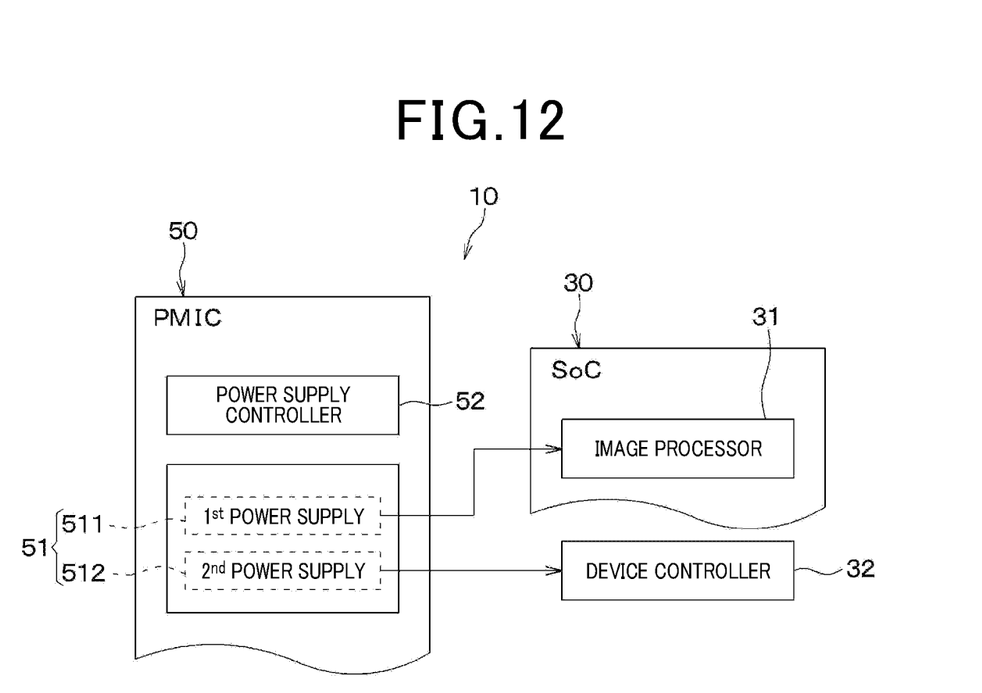
FIG. 12 is a block diagram which illustrates a surroundings monitoring system according to the third embodiment.

The surroundings monitor 20 is, as can be seen in FIG. 12, equipped with a controller which includes the image processor 31 and the device controller 32 which are made of separate semiconductor chips. In other words, the SoC 30 is designed to include the image processor 31, but not have the device controller 32. The device controller 32 is made of, for example, a microcomputer in the form of a semiconductor chip.

Other arrangements are identical with those in the first embodiment. The power supply controller 50 in this embodiment offers substantially the same beneficial advantages as those in the first embodiment.

1) The use of separate or discrete semiconductor chips to make the image processor 31 and the device controller 32 may result in a decrease in manufacturing cost of the surroundings monitor 20 and also enables the supply of power to be controlled independently for each of the image processor 31 and the device controller 32.

Other Embodiments

This disclosure has referred to the preferred embodiments, but however, may not be limited thereto, but modified in the following ways.

The threshold changing condition in the above embodiment is defined as a condition which is satisfied in a period of time between the start of supply of electrical power to the surroundings monitor 20 and the completion of start of the image processor 31 of the surroundings monitor 20, but however, may be altered. For instance, the threshold changing condition may be selected to be met immediately after or a given period of time after the completion of start of the surroundings monitor 20.

The disclosure has referred to the power supply controller 50 which is used with the surroundings monitoring system 10 working as a surround view monitor to monitor surroundings of the vehicle using the in-vehicle camera 21, but however, the power supply controller 50 may alternatively be used in a monitoring system equipped with a millimeter-wave radar or a LiDAR (Light Detection and Ranging) working to monitor surroundings of the vehicle using infrared light. In such a case, the millimeter-wave radar or the LiDAR functions as the above described sensor.

The component parts described in the above embodiments are not necessarily essential unless otherwise specified or viewed to be essential in principle.

When the number of the component parts, a numerical number, a volume, or a range is referred to in the above discussion, this disclosure is not limited to it unless otherwise specified or viewed to be essential in principle.

Similarly, when the shape of, the orientation of, or the positional relation among the component parts is referred to in the above discussion, this disclosure is not limited to it unless otherwise specified or viewed to be essential in principle.

The operations of the power supply controller 50 in the above embodiments may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. Computer-executed programs may be stored as computer executed instructions in a non-transitory computer readable medium. The means for performing the functions of parts of the power supply controller 50 need not necessarily include software, but may be realized one or a plurality of hardware devices.

While the preferred embodiments have been disclosed in order to facilitate better understanding of the invention, it should be appreciated that the invention can be embodied in various ways without departing from the principle of the invention.

What is claimed is:

1. A power supply controller which is configured to control electrical power supplied to a surroundings monitor which includes a sensor serving to detect conditions of surroundings of a vehicle and a monitoring device serving to monitor the surroundings of the vehicle using an output from the sensor, comprising:
   a voltage detector which measures an operating voltage for the monitoring device; and
   an abnormality determiner which determines whether the operating voltage, as measured by the voltage detector, lies in a normal voltage range or an abnormal voltage range, wherein
   until a given threshold changing condition is met after start of power supply to the surroundings monitor, the abnormality determiner alters at least one of an upper limit threshold and a lower limit threshold of the normal voltage range to decrease a difference between the upper limit threshold and the lower limit threshold to be lower than that after the given threshold changing condition is satisfied.

2. The power supply controller as set forth in claim 1, wherein the threshold changing condition is a condition which is met between start of supply of the electrical power to the surroundings monitor and completion of start of the surroundings monitor.

3. The power supply controller as set forth in claim 2, wherein the threshold changing condition is satisfied upon expiry of a given period of time after start of supply of the electrical power to the surroundings monitor, and the given period of time is selected to be less than or equal to a required start time that is a period of time required to complete start of the monitoring device after start of power supply to the surroundings monitor.

4. The power supply controller as set forth in claim 1, wherein the monitoring device is actuated in response to or after reception of a standby cancellation signal to cancel a standby state of the monitoring device following start of supply of the electrical power to the surroundings monitor, and the threshold changing condition is a condition which is met between the start of supply of the electrical power to the surroundings monitor and cancelling of the standby state of the monitoring device.

5. The power supply controller as set forth in claim 1, wherein the surroundings monitor includes a device controller which is actuated prior to actuation of the monitoring device and works to control operations of the sensor and the monitoring device, and the threshold changing condition is a condition which is satisfied at a time when the abnormality determiner receives a given signal outputted from the device controller within a period of time between start of the device controller and cancelling of a standby state of the monitoring device.

6. The power supply controller as set forth in claim 5, wherein the monitoring device and the device controller are made of a single semiconductor chip on which an integrated circuit is fabricated.

7. The power supply controller as set forth in claim 5, wherein the monitoring device and the device controller are made of separate semiconductor chips.

8. The power supply controller as set forth in claim 1, wherein the sensor is implemented by an in-vehicle camera which captures an image of surroundings of the vehicle, and the monitoring device is designed as an image processor which process the image captured by the in-vehicle camera.

\* \* \* \* \*